United States Patent
Chang et al.

(10) Patent No.: US 8,509,154 B2
(45) Date of Patent: Aug. 13, 2013

(54) COMMUNICATION SWITCHING SYSTEM AND METHOD THEREOF

(75) Inventors: Chi-Nan Chang, Tu-Cheng (TW);
Chun-Hsiung Hsieh, Tu-Cheng (TW);
Ying-Chen Huang, Tu-Cheng (TW);
Jyun-Chiang Huang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 236 days.

(21) Appl. No.: 13/097,087

(22) Filed: Apr. 29, 2011

(65) Prior Publication Data
US 2012/0243470 A1   Sep. 27, 2012

(30) Foreign Application Priority Data

Mar. 24, 2011   (CN) .......................... 2011 1 0071964

(51) Int. Cl.
*H04W 40/00*   (2009.01)
(52) U.S. Cl.
USPC ........... 370/328; 370/352; 370/353; 455/517; 455/417; 455/406; 455/426.1
(58) Field of Classification Search
USPC ........... 370/328, 352; 455/406, 426.1, 414.1, 455/403, 436, 417, 565; 379/45
See application file for complete search history.

(56) References Cited

U.S. PATENT DOCUMENTS

| | | | | |
|---|---|---|---|---|
| 5,438,609 A * | 8/1995 | Yahagi | ........................ | 455/456.1 |
| 6,035,193 A * | 3/2000 | Buhrmann et al. | ........ | 455/426.1 |
| 6,792,095 B1 * | 9/2004 | Frank | ........................ | 379/216.01 |
| 2005/0048994 A1 * | 3/2005 | Benco et al. | .................. | 455/517 |
| 2008/0009313 A1 * | 1/2008 | Ishii | ........................... | 455/556.1 |
| 2010/0046731 A1 * | 2/2010 | Gisby et al. | ............. | 379/211.01 |
| 2010/0144341 A1 * | 6/2010 | Robbins et al. | ............ | 455/426.1 |

* cited by examiner

*Primary Examiner* — Rasheed Gidado
(74) *Attorney, Agent, or Firm* — Altis Law Group, Inc.

(57) ABSTRACT

A communication switching method is provided. The method is implemented by a communication switching system. The system includes mobile phones, landline phones, and a RFID server. Each mobile phone includes a RFID tag. Each landline phone includes a RFID reader. The RFID server includes a database. The method includes: putting the call on hold through the IP-PBX; transmitting the mobile phone number of a called mobile phone to the RFID server; searching the database to determine whether the mobile phone number is registered; transmitting the landline phone number corresponding to the mobile phone number to the RFID reader when the mobile phone number is registered; determining whether the landline phone corresponding to the landline phone number is busy; and switching the call to the landline phone corresponding to the landline phone number through the IP-PBX when the landline phone corresponding to the landline phone number is idle.

10 Claims, 3 Drawing Sheets

COMMUNICATION SWITCHING SYSTEM AND METHOD THEREOF

BACKGROUND

1. Technical Field

The present disclosure relates to communication switching systems and methods thereof and particularly, to a communication switching system using RFID and a method thereof.

2. Description of Related Art

Nowadays, IP-PBX (Internet Protocol Private Branch Exchange) is used to save cost on internal phone calls. However, when a user A is not at the place where his/her personal landline phone is located, but at the place of user B's landline phone. If user B is trying to call user A from his/her personal landline phone to the mobile phone of the user A, user B does not know the location of user A and when user A is now at user's B landline phone location. The call is transmitted to the Internet network through the IP-PBX, which increases cost on phone call.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Embodiments of the present disclosure are now described in detail, with reference to the accompanying drawings.

Figure 1:
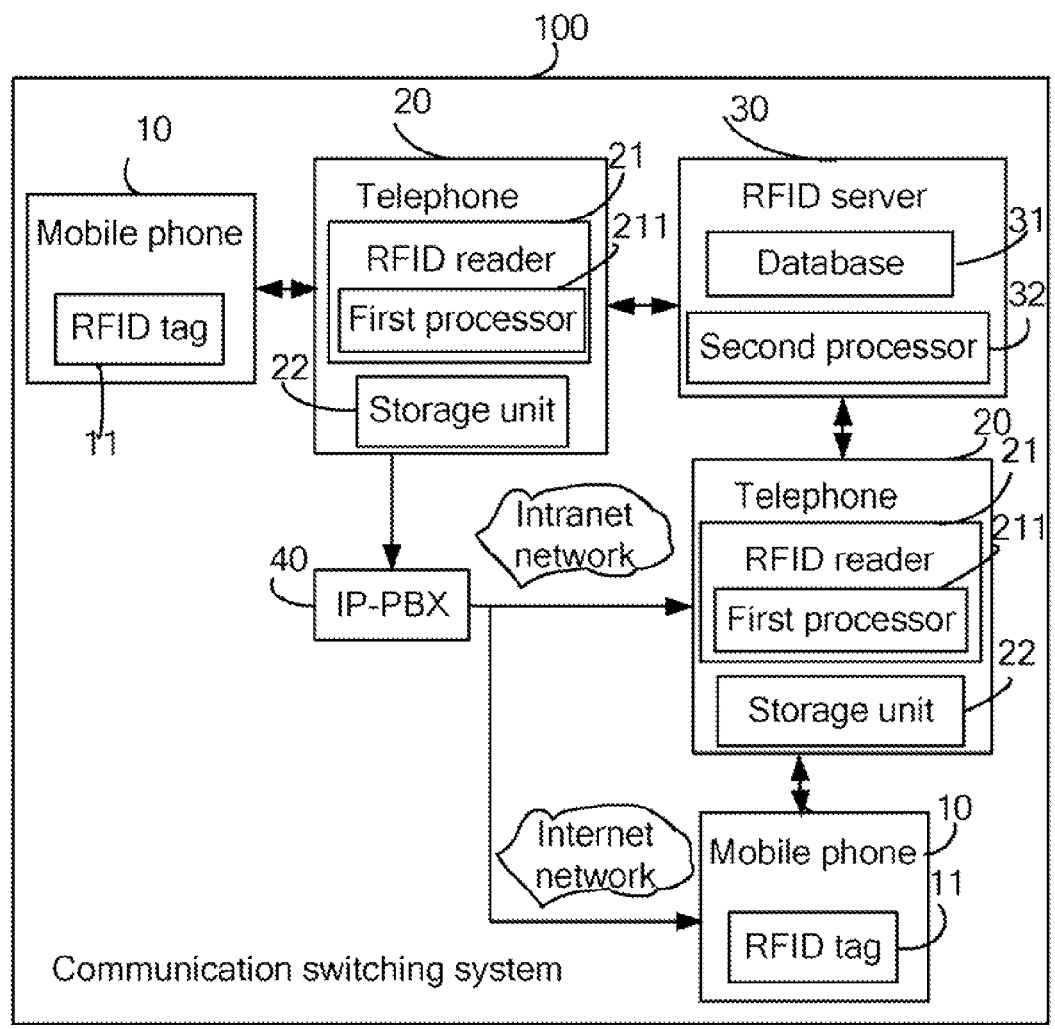
FIG. 1 is a block diagram of a communication switching system in accordance with an exemplary embodiment.

Referring to FIG. 1, a block diagram of a communication switching system 100 in accordance with an exemplary embodiment is shown. The communication switching system 100 includes a number of mobile phones 10, a number of landline phones 20, a RFID server 30, and an IP-Box 40. The mobile phone 10 is to communicate with the landline phones 20 through RFID (Radio-frequency identification, RFID). The call between two landline phones 20 or among landline phones 20 is through the IP-PBX 40. In the embodiment, the landline phones 20 are in an Intranet. The landline phones 20 communicate with the RFID server 30 through wireless or wire technology.

Each mobile phone 10 includes a RFID tag 11. Each RFID tag 11 includes a built-in antenna. Each RFID tag 11 further stores an EPC (Electronic Product Code, EPC) shown as a first table (see below). Each EPC records a mobile phone number of each mobile phone 10.

| First Table |
| --- |
| Mobile phone number |
| 13510135224 |

Each landline phone 20 includes a RFID reader 21 and a storage unit 22. The RFID reader 21 includes a first processor 211. In the embodiment, the RFID reader 21 includes a built-in antenna. In an alternative embodiment, the antenna is external of the RFID reader 21. The RFID reader 21 communicates with the RFID tag 11 through the antenna. The storage unit 22 stores the landline phone number of the landline phone 20.

The RFID server 30 includes a database 31 and a second processor 32. The database 31 includes a first column recording the mobile phone numbers of the mobile phones 10 and a second column recording the landline phone numbers of the landline phones 20 (Shown as a second table see below). In the embodiment, each mobile phone number corresponds to one landline phone number.

| Second Table | |
| --- | --- |
| Mobile phone number | Landline phone number |
| 13510135224 | 666666 |
| ... | ... |
| 13588888888 | 888888 |

When the distance between the mobile phone 10 and the landline phone 20 is within a preset range, the RFID tag 11 periodically transmits the stored EPC to the RFID reader 21 through the built-in antenna.

The first processor 211 receives the EPC through the antenna, and transmits the received EPC and its landline phone number to the RFID server 30. The second processor 32 of the RFID server 30 searches the database 31 to determine whether the mobile phone number recorded in the EPC and the landline phone number are registered.

If not, the second processor 32 registers the mobile phone number and the landline phone number to the database 31. If yes, the second processor 32 does not register the mobile phone number and the phone number.

When the distance between the mobile phone 10 and the landline phone 20 is out of the preset range, the RFID reader 21 cannot receive the EPC transmitted by the RFID tag 11, and the first processor 211 only transmits its landline phone number to the RFID server 30. When the second processor 32 only receives the landline phone number, the second processor 32 deletes the registered landline phone number and the corresponding mobile phone number from the database 31.

An example is given to better illustrate the present disclosure. When a user A uses one landline phone 20 to call one mobile phone 10 of a user B, the IP-PBX 40 temporarily puts the call on hold. The first processor 211 of the user A transmits the mobile phone number of the called mobile phone 10 to the RFID server 30. The second processor 32 of the RFID server 30 searches the database 31 to determine whether the mobile phone number of the called mobile phone 10 is registered in the database 31. If not, namely, the user B carrying the mobile phone 10 is not at the place where any other landline phone 20 is located, the IP-PBX 40 switches the call to the called mobile phone 10 through the Internet network.

If yes, namely, the user B carrying the mobile phone 10 is at the place where another landline phone 20 is located, the second processor 32 obtains the landline phone number of the other landline phone 20, and transmits the obtained landline phone number to the landline phone 20 of the user A. The first processor 211 of the landline phone 20 of the user A receives the landline phone number, and determines whether the landline phone 20 corresponding to the received landline phone number is busy through the IP-PBX 40. If the landline phone 20 corresponding to the received landline phone number is busy, the IP-PBX 40 switches the call to the called mobile phone 10 through the Internet network. If the landline phone corresponding to the received landline phone number is idle, the IP-PBX 40 switches the call to the landline phone 20 corresponding to the received landline phone number through the Intranet network.

In this way, the call from a landline phone 20 to a mobile phone 10 originally through the Internet network will be switched to the landline phone 20 in an Intranet network, which saves cost on calls.

Figure 2:
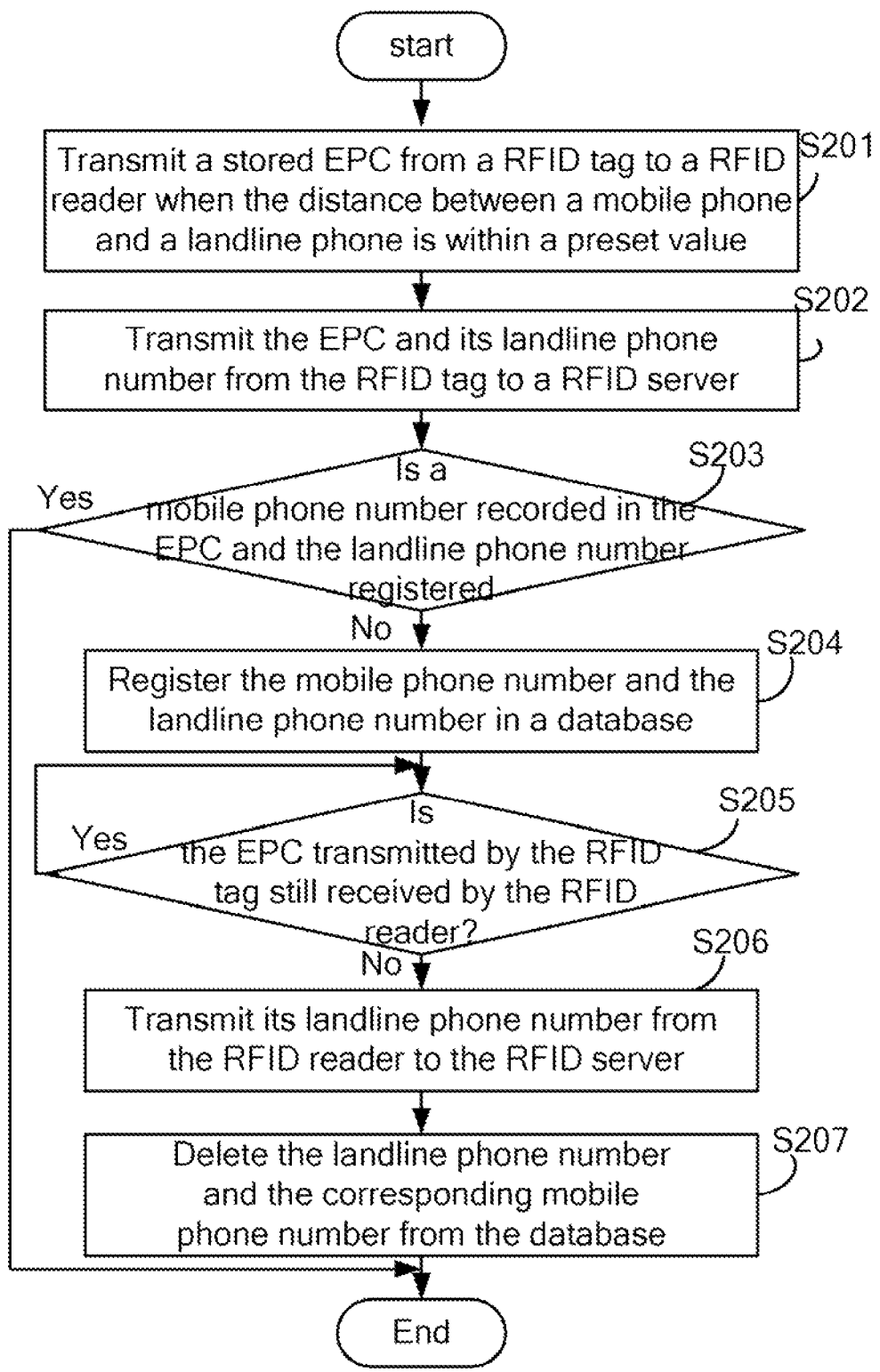
FIG. 2 is a flowchart of a registering method on a database in accordance with an exemplary embodiment.

Referring to FIG. 2, a flowchart of a registering method on a database in accordance with an exemplary embodiment is shown.

In step S201, when the distance between one mobile phone 10 and one landline phone 20 is within a preset range, a RFID tag 11 of the mobile phone 10 transmits a stored EPC to a RFID reader 21 of the landline phone 20 through the antenna.

In step S202, a first processor 211 of the RFID reader 21 transmits the EPC and its landline phone number to a RFID server 30.

In step S203, a second processor 32 of the RFID server 30 searches a database 31 to determine whether the mobile phone number recorded in the EPC and the landline phone number are registered. If not, the procedure goes to step S204. If yes, the procedure goes to step S205.

In step S204, the second processor 32 registers the mobile phone number and the landline phone number to the database 31. In the embodiment, each mobile phone number corresponds to one landline phone number.

In step S205, the RFID reader 21 determines whether the EPC transmitted by the RFID tag 11 is still received. If the EPC transmitted by the RFID tag 11 is still received, step S205 is repeated. If the EPC transmitted by the RFID tag 11 is not received, the procedure goes to step S206.

In step S206, the first processor 211 only transmits its landline phone number to the RFID server 30.

In step S207, the second processor 32 receives the landline phone number and deletes the landline phone number and the corresponding mobile phone number from the database 31.

Figure 3:
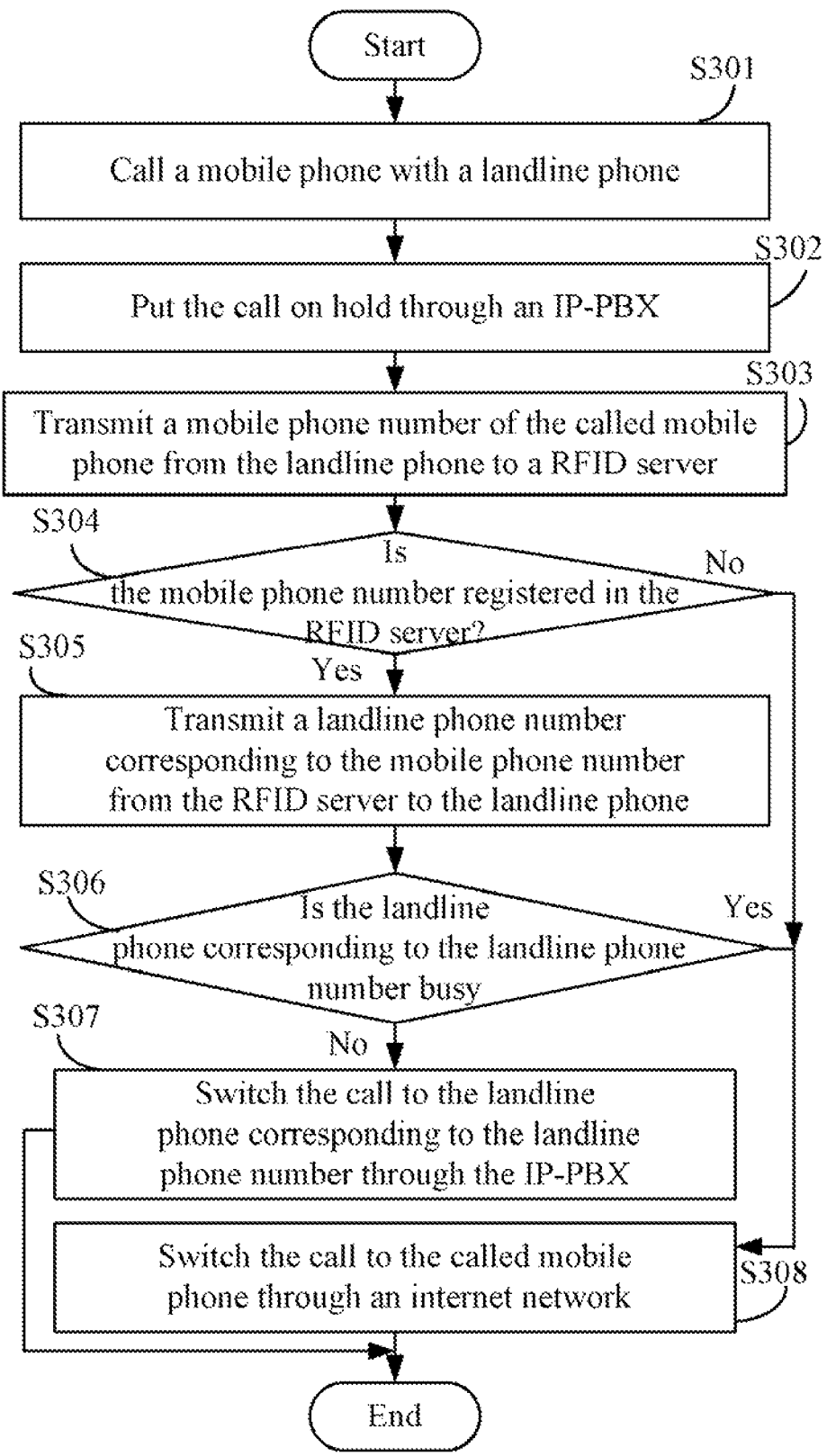
FIG. 3 is a flowchart of a communication switching method in accordance with an exemplary embodiment.

Referring to FIG. 3, a flowchart of a communication switching method in accordance with an exemplary embodiment is shown.

In step S301, one landline phone 20 is used to call a mobile phone 10 through an IP-PBX 40.

In step S302, the IP-PBX 40 temporarily puts the call on hold.

In step S303, a first processor 211 of the being used landline phone 20 transmits the mobile phone number of the called mobile phone 10 to a RFID server 30.

In step S304, a second processor 32 of the RFID server 30 searches a database 31 to determine whether the mobile phone number of the called mobile phone 10 is registered. If yes, the procedure goes to step S305. If not, the procedure goes to step S309.

In step S305, the second processor 32 obtains the landline phone number corresponding to the mobile phone number of the called mobile phone 10, and transmits the obtained landline phone number corresponding to the mobile phone number to the being used landline phone 20.

In step S306, the first processor 211 receives the landline phone number corresponding to the mobile phone number, and determines whether the landline phone 20 corresponding to the received landline phone number is busy through the IP-PBX 40. If the landline phone 20 corresponding to the received landline phone number is idle, the procedure goes to step S307. If the landline phone 20 corresponding to the received landline phone number is busy, the procedure goes to step S308.

In step S307, the IP-PBX 40 switches the call to the landline phone 20 corresponding to the received landline phone number.

In step S308, the IP-PBX 40 switches the call to the called mobile phone 10 through the Internet network.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A communication switching system comprising:
an IP-PBX (Internet Protocol Private Branch Exchange);
a plurality of mobile phones, each of the mobile phones comprising a RFID (Radio-Frequency Identification) tag;
a plurality of landline phones, each of the landline phones to communicate with another one of the landline phones through the IP-PBX, each of the landline phones comprising a RFID reader, each of the RFID readers comprising a first processor, the RFID readers to communicate with the RFID tag through RFID, when the distance between one of the mobile phones and one of the landline phones is in a preset range; and
a RFID server comprising a database and a second processor, the database to record the mobile phone numbers of the mobile phones and the landline phone numbers of the landline phones, the RFID server being capable of communicating with the landline phones;
wherein when one of the landline phones is used to call one of the mobile phones, the IP-PBX temporarily puts the call on hold, the first processor of the being used landline phone transmits the mobile phone number of the called mobile phone to the RFID server, the second processor of the RFID server searches the database to determine whether the mobile phone number corresponding to the called mobile phone is registered, and transmits the landline phone number corresponding to the mobile phone number to the RFID reader when the phoned mobile phone number corresponding to the called mobile phone is registered, the first processor of the RFID reader receives the landline phone number corresponding to the mobile phone number and determines whether the landline phone corresponding to the received landline phone number is busy through the IP-PBX, the IP-PBX switches the call to the landline phone corresponding to the received landline phone number when the landline phone corresponding to the received landline phone number is idle, and
wherein each of the landline phones further comprises a storage unit storing its landline phone number, each of the RFID tags stores an EPC (Electronic Product Code) recording one of the mobile phone numbers of each of the mobile phones, when the distance between the mobile phone and the landline phone is within a preset value, the RFID tag of the mobile phone transmits the EPC to the RFID reader, the first processor transmits the EPC and its landline phone number to the RFID server, the second processor of the RFID server searches the database to determine whether the mobile phone number recorded in the EPC and the landline phone number are registered, and registers the mobile phone number and the landline phone number in the database when the mobile phone number and the landline phone number are not registered.

2. The communication switching system as described in claim 1, wherein the IP-PBX switches the call to the called mobile phone through an Internet network when the mobile phone number of the called mobile phone is not registered in the database.

3. The communication switching system as described in claim 1, wherein the IP-PBX switches the call to the called mobile phone through an Internet network when the landline phone corresponding to the received landline phone number is busy.

4. The communication switching system as described in claim 1, wherein each of the mobile phone numbers corresponds to one of the landline phone numbers.

5. The communication switching system as described in claim 1, wherein when the RFID reader can not receive the EPC transmitted by the RFID tag of the mobile phone, the first processor only transmits its landline phone number to the RFID server, the second processor of the RFID server receives the landline phone number and deletes the landline phone number and the corresponding mobile phone number from the database according to the received landline phone number.

6. A communication switching method, which is implemented by a communication switching system, the communication switching system comprising an IP-PBX (Internet Protocol Private branch exchange), a plurality of mobile phones, a plurality of landline phones, and a RFID server, each of the mobile phones comprising a RFID (Radio-Frequency Identification) tag, each of the landline phones comprising a RFID reader, each of the landline phones communicating with another one of the landline phones through the IP-PBX, the RFID reader to communicate with the RFID tag through the RFID when the distance between one landline phone and one mobile phone is in a preset range, the RFID server comprising a database to record the mobile phone numbers of the mobile phones and landline phone numbers of the landline phones, the RFID server being capable of communicating with the RFID reader, the method comprising:

putting the call on hold through the IP-PBX when one of the landline phones is used to call one of the mobile phones;

transmitting the mobile phone number of the called mobile phone to the RFID server;

searching the database to determine whether the mobile phone number of the called mobile phone is registered;

transmitting the landline phone number corresponding to the mobile phone number of the called mobile phone to the RFID reader of the landline phone when the mobile phone number of the called mobile phone number is registered;

receiving the landline phone number corresponding to the mobile phone number of the called mobile phone, and determining whether the landline phone corresponding to the received landline phone number is busy through the IP-PBX; and switching the call to the landline phone corresponding to the received landline phone number through the IP-PBX when the landline phone corresponding to the received landline phone number is idle, wherein the landline phone further comprises a storage unit recording its landline phone number, the RFID tag of the mobile phone storing an EPC (Electronic Product Code) recording the mobile phone numbers of the mobile phones, the method further comprises:

transmitting the EPC to the RFID reader of the landline phone when the distance between the mobile phone and the landline phone is within a preset value;

transmitting the EPC and its landline phone number to the RFID server;

searching the database to determine whether the mobile phone number recorded in the EPC and the landline phone number are registered; and registering the mobile phone number and the landline phone number in the database when the mobile phone number recorded in the EPC and the landline phone number are not registered.

7. The communication switching method as described in claim 6, wherein the method further comprises:

switching the call to the called mobile phone through the Internet network when the mobile phone number corresponding to the called mobile phone is not registered.

8. The communication switching method as described in claim 6, wherein the method further comprises:

switching the call to the called mobile phone through the Internet network when the landline phone corresponding to the received landline phone number is busy.

9. The communication switching method as described in claim 6, wherein each of the mobile phone numbers corresponds to one of the landline phone numbers.

10. The communication switching method as described in claim 6, wherein the method further comprises:

determining whether the RFID reader can receive the EPC transmitted by the RFID tag of the mobile phone;

transmitting its landline phone number to the RFID server when the RFID reader can not receive the EPC transmitted by the RFID tag of the mobile phone;

receiving the landline phone number and deleting the landline phone number and the corresponding mobile phone number from the database according to the received landline phone number.

* * * * *